(12) United States Patent
Chen et al.

(10) Patent No.: US 8,285,842 B1
(45) Date of Patent: Oct. 9, 2012

(54) METHOD AND APPARATUS FOR DYNAMICALLY SPECIFYING LOCATION COLLECTION AND COMPUTATION LOGIC

(75) Inventors: Tsuwei Chen, Cupertino, CA (US); Zhengrong Ji, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 181 days.

(21) Appl. No.: 12/900,982

(22) Filed: Oct. 8, 2010

(51) Int. Cl.
*G06F 15/16* (2006.01)
*G06F 15/173* (2006.01)

(52) U.S. Cl. ........ 709/224; 709/217; 709/226; 709/231; 709/246

(58) Field of Classification Search .................. 709/217, 709/224, 226, 249; 370/229; 455/415, 456.1
See application file for complete search history.

(56) References Cited

U.S. PATENT DOCUMENTS

| | | | |
|---|---|---|---|
| 6,763,362 B2 * | 7/2004 | McKeeth | 370/229 |
| 7,272,133 B2 * | 9/2007 | Valin et al. | 709/249 |
| 7,433,694 B2 * | 10/2008 | Morgan et al. | 455/456.1 |
| 7,660,853 B2 * | 2/2010 | Scott et al. | 709/217 |
| 7,778,438 B2 * | 8/2010 | Malone | 382/100 |
| 2009/0030778 A1 * | 1/2009 | Zapata et al. | 705/10 |
| 2010/0056119 A1 * | 3/2010 | Shaffer et al. | 455/415 |

* cited by examiner

*Primary Examiner* — Quang N. Nguyen
(74) *Attorney, Agent, or Firm* — McDermott Will & Emery LLP

(57) ABSTRACT

The invention pertains to dynamic specification of location collection and computation logic. First, a request for location data from an end device is received. The location data is loaded from at least one electronic database. It is then determined whether an algorithm version number is indicated in the request and whether the algorithm version number indicated in the request equals a latest algorithm version number. The location data and an algorithm for location collection and computation is embedded in a stream, if it is determined that the algorithm version number is not indicated in the request or that the algorithm version number indicated in the request is not equal to the latest algorithm version number. Only the location data is embedded in the stream, if it is determined that the algorithm version number is indicated in the request and that the algorithm version number indicated in the request is equal to the latest algorithm version number. The stream is then streamed to the end device.

22 Claims, 4 Drawing Sheets

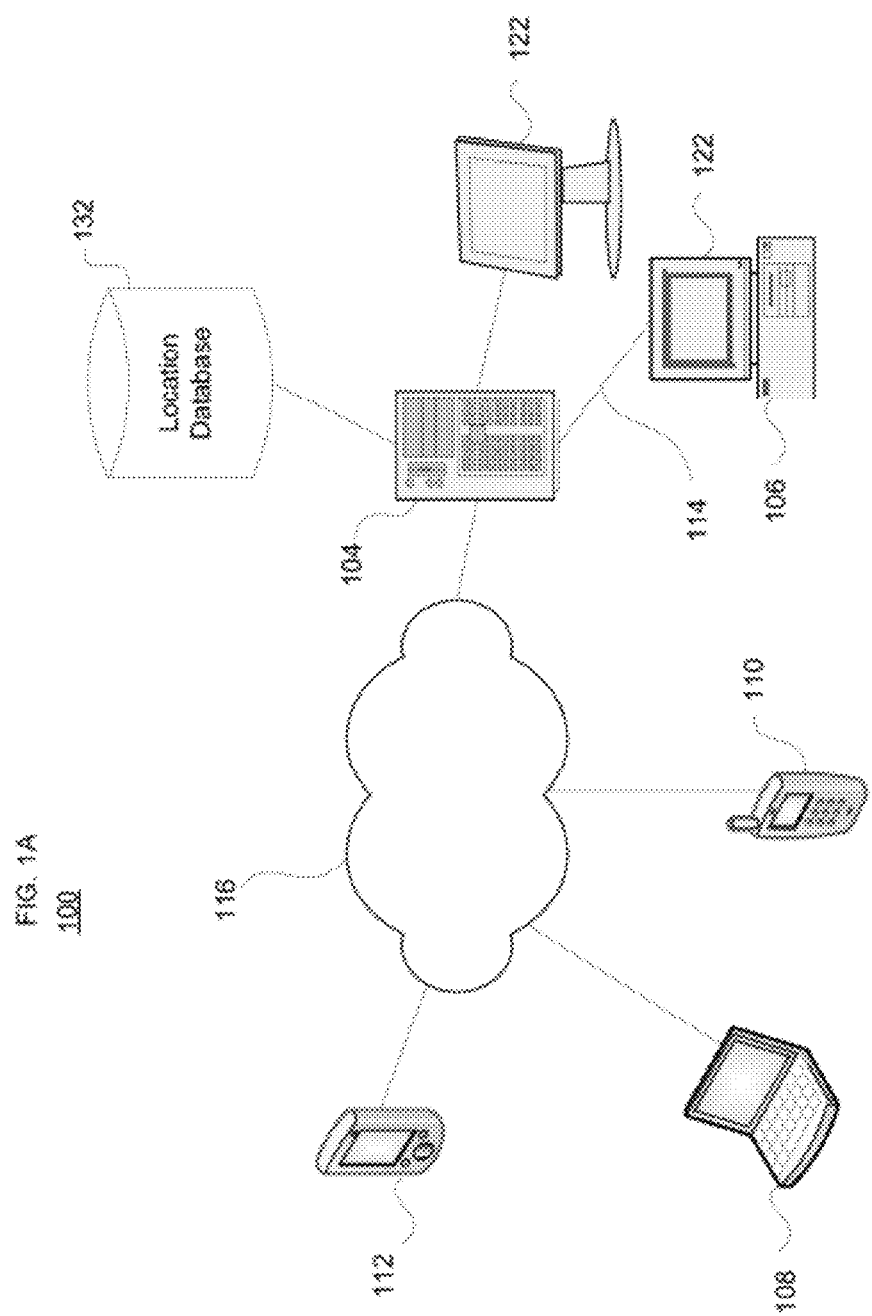

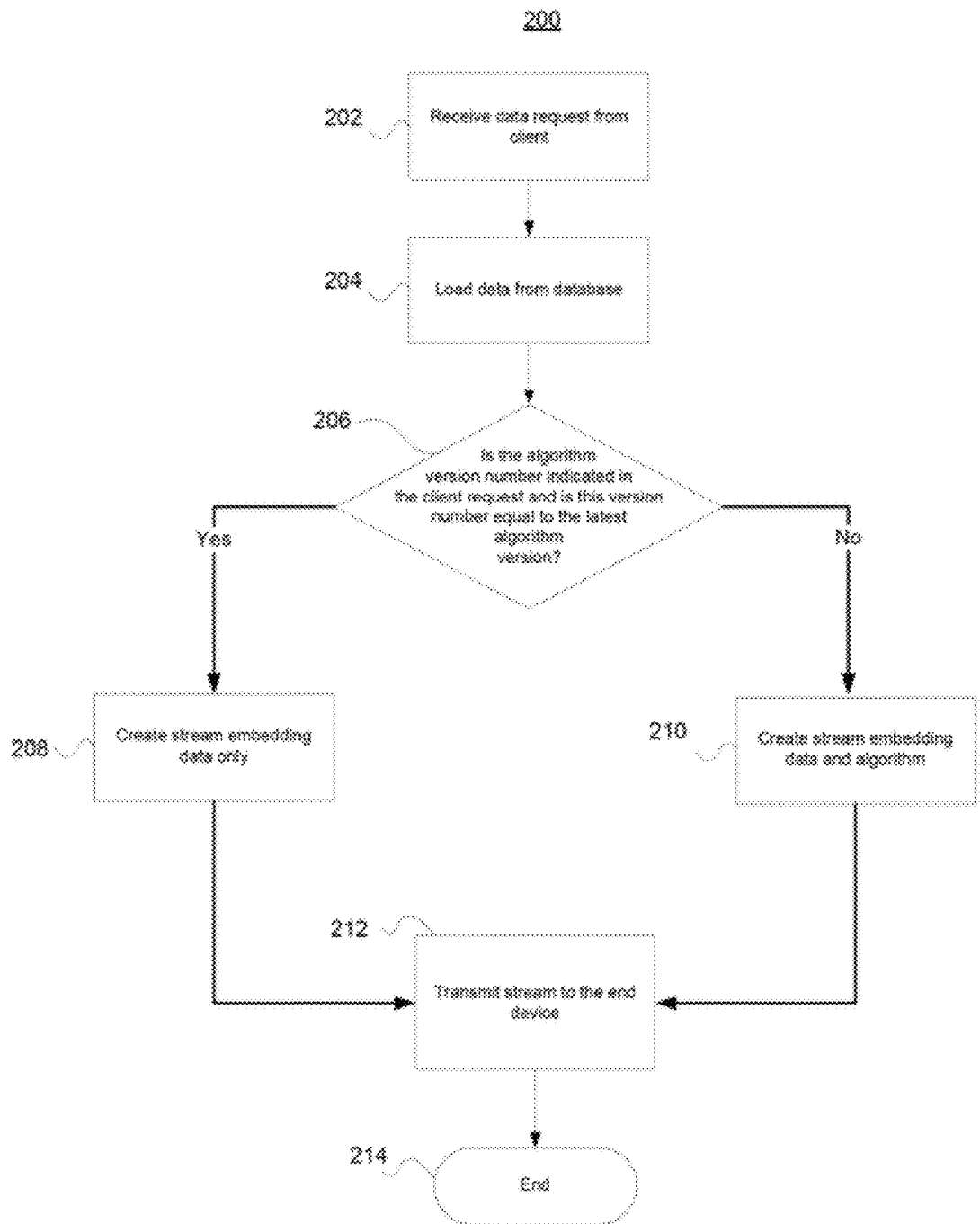

300

METHOD AND APPARATUS FOR DYNAMICALLY SPECIFYING LOCATION COLLECTION AND COMPUTATION LOGIC

BACKGROUND OF THE INVENTION

1. Field of the Invention

Aspects of the invention relate generally to location-based services and applications for mobile devices. More particularly, aspects of the invention relate to dynamic construction of location collection and computation logic.

2. Description of Related Art

Location-based services and applications are becoming more and more popular as the number and types of portable electronic devices increases. Devices such as mobile telephones, PDAs and laptop/palmtop computers may be used indoors and outdoors in one location or while on the go. The location of a user's mobile device ("end device") may be found with a number of different technologies ranging from traditional Global Positioning System ("GPS") technology to more sophisticated network-based solutions. Typically, cellular tower locations and Wi-Fi™ access points are the "signals" used for this purpose.

In order to derive an accurate end device location, network based solutions typically require numerous components working in tandem. One such component is a database of cellular tower or Wi-Fi™ access point locations ("location database"). Since no single entity provides a complete set of location information, this information is collected through war-driving or data collection logs built into the end device. Another important component of network based solutions is the end-point location serving logic. This logic is applied to the data gathered from the location database in order to reach an accurate final location.

When the use of network-based location services emerged, location service providers typically computed the location of end devices at centralized servers or server farms. However, as location based applications spread and multiple client applications began to make countless simultaneous requests, such servers could not effectively support the rapid increase in demand. Therefore, many location service providers recently have been shifting the final location computation logic into the end devices.

While shifting computation logic to the end device reduces network demand and server processor usage, new problems have surfaced. Maintaining synchronicity between the location calculation software logic on end devices and the server side software is challenging. End devices that collect raw data from the server may not be aware of new server side software needs. If the end device software was written before new problems were discovered and resolved on the server side, discrepancies can occur between the end device software and server side software. The end device software often provides redundant data to the server that consumes extra computation power at both ends and also wastes network bandwidth. Furthermore, because location service requires constant processing that changes over time, end device software often uses conservative location calculation algorithms to avoid future problems at the expense of using more efficient algorithms.

BRIEF SUMMARY OF THE INVENTION

Aspects of the invention provide end device location collection and computation logic that is dynamically constructed by the end device in accordance with processes provided by a remote server. In one aspect, a method for dynamically specifying location collection and computation logic is provided. The method comprises receiving a request for location data from an end device; loading the location data from at least one electronic database; determining whether an algorithm version number is indicated in the request and whether the algorithm version number indicated in the request equals a latest algorithm version number; embedding the location data and an algorithm for location collection and computation in a stream, if it is determined that the algorithm version number is not indicated in the request or that the algorithm version number indicated in the request is not equal to the latest algorithm version number; embedding only the location data in the stream, if it is determined that the algorithm version number is indicated in the request and that the algorithm version number indicated in the request is equal to the latest algorithm version number; and, streaming the stream to the end device.

In one example, the location data contains information regarding at least one of cellular towers and wireless access points and the stream is in a wire format. In another example, the algorithm is specified using function blocks predefined in a location program of the end device and the algorithm reflects relevant changes on the server.

In a further example, the location program accommodates relevant changes on the server in order to effectively process location data and compute location and the algorithm is consistent with the location data structure. In one alternative, the end device is a mobile computing device and the algorithm version number represents the current version of the location collection and computation algorithm stored in the mobile computing device.

In another embodiment, a processing system for dynamically specifying location collection and computation logic is provided. The processing system of the alternate embodiment comprises at least one processor and a streamer module associated with the at least one processor. In one example, the streamer module is configured to receive a request for location data from an end device, the request containing an algorithm version number; to load the location data from at least one electronic database; to determine whether an algorithm version number is indicated in the request and whether the algorithm version number indicated in the request equals a latest algorithm version number; to embed the location data and an algorithm for location collection and computation in a stream, if it is determined that the algorithm version number is not indicated in the request or that the algorithm version number indicated in the request is not equal to the latest algorithm version number; to embed only the location data in the stream, if it is determined that the algorithm version number is indicated in the request and that the algorithm version number indicated in the request is equal to the latest algorithm version number; and, to stream the stream to an end device.

In one example, the streamer module is configured to create the stream in a wired format and the streamer module is configured to construct the algorithm using function blocks predefined in a location program of the end device. In a further example, the streamer module is configured to communicate with the location program of the end device. In another embodiment, the streamer module is configured to analyze and characterize the location data and the streamer module is configured to check for relevant changes on the system.

In a further example, a method for executing a location collection and calculation algorithm is also provided, comprising a processor of an end device transmitting a request for data, the request containing an algorithm version number; receiving a stream from a server at an end device; a processor of the end device parsing the stream; determining if the stream is encoded with an algorithm; mapping the algorithm to predefined function blocks, if it is determined that the stream is encoded with an algorithm; the processor executing the algorithm provided in the stream, if it is determined that the stream is encoded with an algorithm; and, the processor executing a previously stored algorithm, if it is determined that the stream is not encoded with an algorithm, the stream being in a wired format.

In one embodiment, the predefined function blocks define functions, types, and data structures applicable to location collection and computation algorithms. In another aspect, the algorithm version number represents the current version of the location collection and computation algorithm stored in the end device.

Another aspect of the invention provides a location collection and calculation system, comprising a processor and a location program module managed by the processor for executing operations. The location program module of the alternate embodiment being configured to transmit a request for data, the request containing an algorithm version number; to receive a stream from a server at an end device; to parse the stream; to determine if the stream is encoded with an algorithm; to map the algorithm to predefined function blocks, if it is determined that the stream is encoded with an algorithm; to execute the algorithm provided in the stream, if it is determined that the stream is encoded with an algorithm; and, to execute a currently stored algorithm, if it is determined that the stream is not encoded with an algorithm.

In one aspect of the invention, the location program module is configured to parse wire formatted streams and the streams are constructed by a streamer module of the server.

BRIEF DESCRIPTION OF THE DRAWINGS

FIGS. 1A-B illustrate a computer network architecture in accordance with aspects of the invention.

FIG. 2 is a flow diagram of a method for constructing a stream in accordance with one embodiment of the invention.

DETAILED DESCRIPTION

Figure 1B:
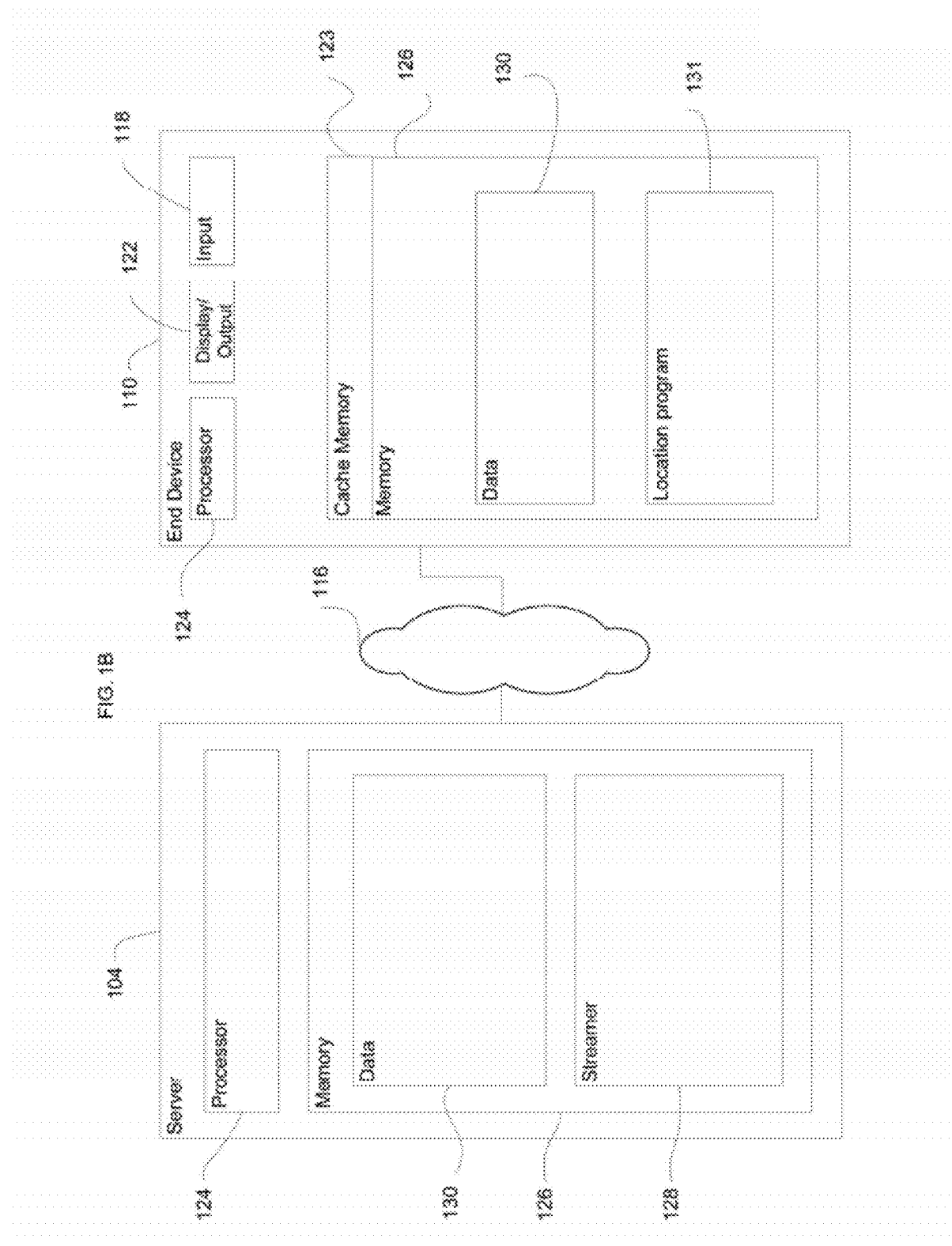

The aspects, features and advantages of the invention will be appreciated when considered with reference to the following description of exemplary embodiments and accompanying figures. The same reference numbers in different drawings may identify the same or similar elements. Furthermore, the following description does not limit the invention; rather, the scope of the invention is defined by the appended claims and equivalents.

In accordance with aspects of the invention, basic function blocks are defined in the end device software that may be applicable in collection and location computation logic. As will be explained in more detail below, in one embodiment, a server program may use these predefined function blocks to execute an algorithm that best characterizes the data being served to the end device or that best reflects changes/updates on the server. The preinstalled end device software may then execute the basic function blocks as specified by the constructed algorithm provided by the server.

Turning to FIG. 1A, this illustration presents a schematic diagram of a computer system depicting various computing devices that can be used alone or in a networked configuration in accordance with aspects of the invention. For example, this figure illustrates a computer network 100 having a server 104 and a plurality of end devices such as a mobile phone 110, a PDA 112, and a portable computer 108. Portable computer 108 may be, e.g., a laptop/palmtop computer. Various elements in the computer network 100 may be interconnected via a local or direct connection 114 and/or may be coupled via a communications network 116 such as a local area network ("LAN"), a Wi-Fi™ network, a wide area network ("WAN"), the Internet, etc., and which may be wired or wireless.

As shown in FIG. 1B, the server 104 and end device 110 contain a processor 124, memory 126 and other components typically present in a computer. It is understood that end device 110 of FIG. 1B may be any other end device, such as, for example, end devices 108 and 112 of FIG. 1A. Moreover, end devices in accordance with the systems and methods described herein may comprise any device capable of processing instructions and transmitting data to and from humans and other computers, including network computers lacking local storage capability, PDA's with modems such as PDA 112 and Internet-capable wireless phones such as mobile phone 110. It is also understood that computer network 100 is not limited to the end devices and the server shown in FIG. 1A, and that other devices, such as a personal computer may also be linked to the network.

Memories 126 of server 104 and end device 110 store information accessible by processor 124, including location program 131 and streamer 128, which may be executed by the processor 124. Data 130 may be retrieved, manipulated and stored by the processor 124. The memory may be of any type capable of storing information accessible by the processor, such as a hard-drive, ROM, RAM, CD-ROM, flash memories, write-capable or read-only memories. The memory may even include a cache memory 123 for efficient retrieval of data by processor 124. The processor 124 may comprise any number of well known processors, such as processors from Intel Corporation or Advanced Micro Devices. Alternatively, the processor may be a dedicated controller for executing operations, such as an ASIC. Communication across the network, including any intervening nodes, may be facilitated by any device capable of transmitting data to and from other computers, such as modems (e.g., dial-up or cable), network interfaces and wireless interfaces. Server 104 may be a web server. Although certain advantages are obtained when information is transmitted or received as noted above, other aspects of the invention are not limited to any particular manner of transmission of information.

Data 130 may be retrieved and stored in memory 126 of server 104 from location database 132. The data 130 may be streamed to end device 110 in a wire format. A wire format is a standard or protocol that governs the transmission of data between server and client devices. A server may stream the data to the client in a predefined wire format and the client may parse the stream according to the format protocol. Some known wire formats are the Extensible Markup Language ("XML") or JavaScript Object Notation ("JSON"). Once parsed by location program 131, the algorithm encoded in the stream may be processed by processor 124, which may be constructed out of the basic function blocks predefined in location program 131. The processor data may be read from the location database 132 of FIG. 1A stored as a collection of data. For instance, although the invention is not limited by any particular data structure, the data in location database 132 may be stored in computer registers, in a relational database as a table having a plurality of different fields and records, etc. The location database 132 of FIG. 1A may be directly or indirectly coupled to server 104. In an alternative, the location database 132 may be part of or otherwise logically associated with the server 104. The location database 132 may include different sets or types of data regarding cellular tower locations or Wi-Fi™ access points.

The data may also be formatted in any computer readable format such as, but not limited to, binary values, ASCII etc. Similarly, the data may include images stored in a variety of formats such as vector-based images or bitmap images using lossless or lossy encoding. Moreover, the data may include any information sufficient to identify the relevant information, such as descriptive text, proprietary codes, pointers, references to data stored in other memories (including other network locations) or information which is used by a function to calculate the relevant data.

Although the processor 124 and memory 126 are functionally illustrated in FIG. 1B as being within the same block, it will be understood that the processor and memory may actually comprise multiple processors and memories that may or may not be stored within the same physical housing or location. For example, some or all of the instructions and data may be stored on a removable CD-ROM or DVD. Alternatively, such information may be stored within a read-only computer chip. Some or all of the instructions and data may be stored in a location physically remote from, yet still accessible by, the processor. Similarly, the processor may actually comprise a collection of processors which may or may not operate in parallel. Data may be distributed and stored across multiple memories 126 such as hard drives, server farms or the like.

In one aspect, server 104 communicates with one or more client end devices such as mobile phone 110, PDA 112, and portable computer 108. Each end device may be configured similarly with a processor, memory and a location program 131, as well as one or more user input device 118 and a user output device 122, such as a display device.

Referring back to FIG. 1B, location program 131 and streamer 128 may be written in any programming language capable of creating or parsing wire formatted data (e.g., JavaScript, Ruby, etc.) In one embodiment, the streamer 128 streams the data and an algorithm using the set of predefined functions that were implemented on the end device 110 using a wire format (e.g., JSON, XML, etc.). The streamed algorithm is preferably tailor made for the accompanying data, which permits a client device receiving the stream to maximize control and usefulness of the data. Next, the location program 131 may perform a location collection and calculation algorithm on the supplied data consistent with the algorithm encoded by streamer 128. The newly parsed instructions are then preferably executed in the end device. In that regard, the terms "instructions," "blocks", "programs", and "scripts" may be used interchangeably herein.

Referring to FIG. 2, an exemplary embodiment of a method 200 executed by the streamer 128 is provided. In block 202, the streamer 128 receives a request for data from a client device in any known or user defined protocol. The request may include an algorithm version number. Next, the streamer 128 loads data from a database, such as the location database 132, in block 204. In block 206, the streamer 128 determines whether the algorithm version number is indicated in the request from the client and whether the algorithm version number is equal to the latest version number stored on the server. If streamer 128 determines that the algorithm version number is provided in the request and that it is equal to the latest version number on the server, streamer 128 may advance to block 208 and construct a data only stream. The rationale for embedding only data, when the algorithm version numbers match, is preservation of bandwidth. Embedding the algorithm when a client device already has the latest version may be redundant. However, if streamer 128 determines that the algorithm version number is not indicated in the request or that it is not equal to the latest version number on the server, streamer 128 may advance to block 210 and construct a stream that includes both the data and the latest algorithm. Next, the streamer 128 may advance to block 212 and transmit the stream to the client, for instance via wireless transceivers at the server 104 and end device 110. In block 214, the streamer 128 may terminate. Making these adjustments in the server 104 is more efficient than adjusting the software in all connecting client devices.

Figure 3:
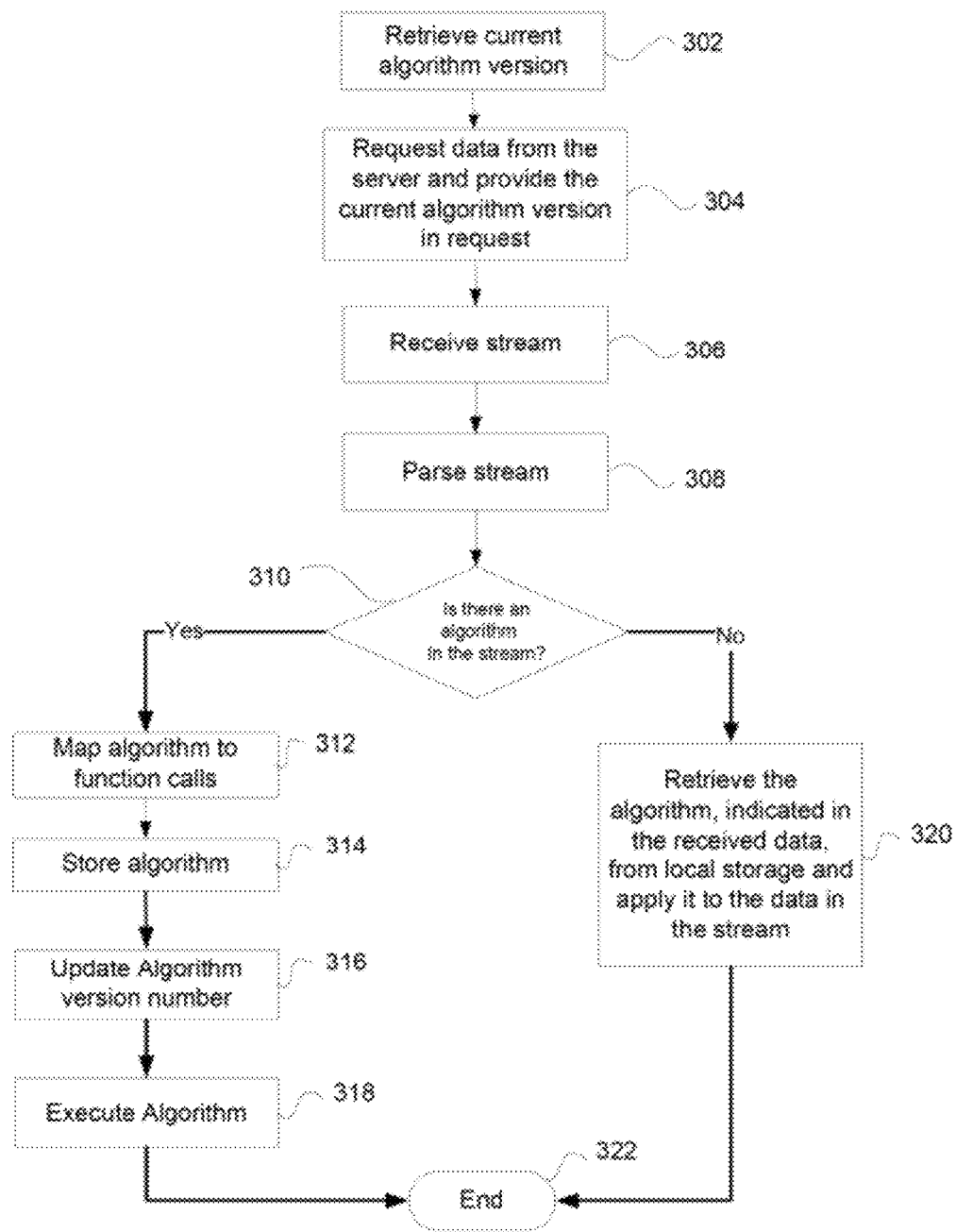
FIG. 3 is a flow diagram of a method for executing an algorithm using predefined function blocks in accordance with one embodiment of the invention.

FIG. 3 discloses an exemplary embodiment of a method 300 implemented by the location program 131. Location program 131 may retrieve a version of the current algorithm stored in the client, in block 302. The version number may be stored in a configuration file, in a registry, in cache memory 123, or in any other storage medium. In block 304, the location program 131 may send a request for data to streamer 128 and include the algorithm version number in the request. Next, in block 306, location program 131 may receive a stream from streamer 128. Next, in block 308, the location program 131 may parse the stream. Once the stream is parsed, location program 131 may determine whether streamer 128 provided an algorithm on the stream, in block 310. If location program 131 determines that an algorithm is provided in the stream the location program 131 may map the functions defined in the stream to the actual function blocks defined in location program 131, in block 312. Then, location program 131 may store the algorithm in permanent storage (e.g., hard drive) or temporary storage (e.g., cache memory) in block 314. In block 316, location program 131 may update the version number of the algorithm to match the algorithm currently stored on the server. Location program 131 may then advance to block 318 and execute the algorithm.

If location program 131 determines that an algorithm is not provided in the stream, location program 131 may advance to block 320 and assume that the data only stream indicates a version number of an algorithm previously sent to the client. In block 320, location program 131 may retrieve the previously sent algorithm, indicated in the received data, from local storage and apply this previously sent algorithm to the data in the stream. Location program 131 terminates in block 322.

The location program 131 may define blocks of functionality that are common to most location collection and location computation algorithms. By way of example, the location program 131 may define the following generic data structures that may be used in a location collection algorithm:

```
struct Position {
    double lat;
    double lng;
    double alt;
    double accuracy;
    double confidence;
};
struct WifiNode {
    MAC mac_address;
    int signal_strength;
    int Position;
};
Struct CellTower {
    CellId cell_id;
    int signal_strength;
    Position Position;
};
```

The illustrative "Position" data structure above may represent a record of an end device's current position. The illustrative position data record is shown defining five fields: latitude ("lat"), longitude ("lng"), altitude ("alt"), accuracy, and confidence ("conf"). Each field is also shown as a type of "double," which is typically used when fractional precision is required.

Next, an illustrative "WifiNode" data structure is shown that may represent a record of a Wi-Fi™ access point. Included in the illustrative data structure are fields that may be essential in identifying a Wi-Fi™ access point position. The fields shown are mac-address, signal strength, and position. The mac-address field is shown using a user defined data type "MAC." The signal strength field is defined as an "int" or integer. The "int" data type is typically used when fractional precision is not required. The position field is defined as "Position," which provides access to the fields defined in the "Position" data structure explained above.

Finally, an illustrative data structure is shown that may represent a record of a cell tower location. The fields defined in the cell tower data structure may be substantially the same as those defined in the "Wifinode" data structure except for the "CellId" field, which may be a unique identifier for cell towers.

Furthermore, if Java is used to implement location program 131, a generic container of type T that can support generic operations, such as, for example, iterator, size( ) InsertAt(i), RemoveAt(i), etc. may be defined. Containers are object data types that store other objects. Additionally, location program 131 may define the following basic operation function blocks:

Now( ); // return current time
Idle(X); // Idle for X second(s)
SetWifiPowerMode(X);
SetCellularPowerMode(X);
SetGpsPowerMode(X);
GetWifiScanResult( )
GetCellularIdResult( )
Return <T>(a,b,c, . . . ); // using the parameters (a,b,c . . . ) construct a value of type T The functions above are illustrative tools that may be used for various location collection and calculation processes. The "SetWifiPowerMode," "SetCellularPowerMode," and "SetGpsPowerMode" may be used to set a particular peripheral of a client device to a particular power state. In most situations, these functions may be used to disable or enable a certain peripheral. By way of example, SetWifiPowerMode(ON) may be used to turn on a Wifi chipset in order to use Wifi for scanning. Likewise, SetGpsPowerMode (OFF) may turn off the GPS to preserve battery life. Furthermore, GetGpsPowerMode( ) GetWifiPowerMode( ) and GetCellularIdPowerMode( ) may be used to retrieve the current power status of a particular peripheral. The illustrative "GetWifiScanResult" and "GetCellularIdResult" functions may return "WifiNode" and "CellTower" records, respectively, after scanning for Wi-Fi and cell tower access points in the immediate vicinity. The "Return <T>" function may have various uses and is defined generically to return any type of data.

Location program 131 may also define generic math operations, comparator operations, and execution operations such as the following:

ADD(A,B):=A+B
SUB(A,B):=A−B
MULT(A,B):=A*B
DIV(A,B):=A/B
GT(A,B):=A>B
LT(A,B):=A<B
EQ(A,B):=A==B
IF(T,A,B):=if (T) do A; else do B;
Sequence(A,B,C . . . ):=do A; do B; do C; . . .
Repeat(A,n):=perform task A n times
A(B):=do B( ) pass the result of B to A( )
ScheduleTask(task, t); schedule task to be performed after t seconds
SchedulePeriodicalTask(task, t): schedule task to be performed every t seconds The above data structures and function blocks are merely for illustrative purposes and other combinations of data structures and generic functions may be defined. By way of example, assume the data collection algorithm dictates that two Wi-Fi™ scans that are at least ten seconds apart should be performed with GPS location every thirty minutes. The following example implements this algorithm using the illustrative definitions presented above:

```
Sequence(Assign(task,
    If(GT(Now( )−LastUpdate( ),180),
    Repeat(Sequence(SetGpsPowerMode(1),
    Upload(ScanWifiScanResult( ),
    Idle(10)), 2),
    NOP));
SchedulePeriodicalTask(task, 10);
```

The above code represents the algorithm "perform two Wi-Fi scans that are at least ten seconds apart every thirty minutes" using the illustrative predefined function blocks above. An end device, such as end device 110, may implement the above code via location program 131. The illustrative sequence function may receive tasks as parameters and may execute each one sequentially.

For deriving a location, more advanced blocks may be defined, such as the following:

FieldSum(Container<T>,f):=summation of all elements in the container, on member f;
double Distance(A,B) // compute the location between Position A and Position B
double Heading(A,B) // compute the heading from Position A and Position B
IntersectionCircle(A, B) // compute a new Position point C whose location and accuracy forms a circle that exactly cover the intersected area form The above location deriving function blocks are also merely illustrative and other function definitions may be defined. By way of example, assume the location program 131 is instructed to execute a centroid algorithm where the final location is simply determined by the average of all location latitudes, longitudes, and altitudes. A confidence parameter may also be factored into the centroid algorithm in order to determine the reliability of the latitude, longitude, and altitude parameters. The confidence parameter may range from 0% to 100%. Also, assume that all individual access point locations have been cached in cache memory 123 of FIG. 1B and all near by access points have been extracted into a container C. The location program 131 may execute the centroid algorithm as the following:

Sequence(Assign(Lat,Div(FieldSum(C,lat),sizeof(C))),
Assign(Lng,Div(Fieldsum(C,lng),sizeof(C))),
Assign(Alt,Div(Fieldsum(C,alt),sizeof(C))),
Assign(Acc,Div(Fieldsum(C,acc),sizeof(C))),
Assign(Conf,Div(Fieldsum(C,conf),sizeof(C))),
return<Position>(Lat, Lng, Alt, Acc, Conf))

Once the syntax for the function blocks is defined, the location program 131 is indifferent to the wire format used by the server 104 when streaming the algorithm. For example, the server can stream the above algorithm in JSON as the following:

```
{
Container: C
Sequence:{assign:[Lat,Div:[Fieldsum:[C,lat], sizeof: C]],
    assign:[Lng,Div:[Fieldsum:[C,lng], sizeof: C]],
    assign:[Alt,Div:[Fieldsum:[C,alt], sizeof: C]],
    assign:[Acc,Div:[Fieldsum:[C,acc], sizeof: C]],
    assign:[Conf,Div:[Fieldsum:[C,conf], sizeof: C]],
    return:[Point:{Lat,Lng,Acc,Alt,Acc,Conf}]}}
```

Alternatively, the server 104 may use XML to stream the algorithm to location program 131 as the following:

```
<!DOCTYPE "some doc type"<
<Sequence>
<Assign>
Lat,<Div>
    <Fieldsum>C, lat</FieldSum>,
    <sizeof>C</sizeof>
    </Div>
<\Assign>
<Assign>
Lng, <Div>
    <Fieldsum>C, lng</FieldSum>,
    <sizeof>C</sizeof>
    </Div>
<\Assign>
<Assign>
Alt, <Div>
    <Fieldsum>C, alt</FieldSum>,
    <sizeof>C</sizeof>
    </Div>
<\Assign>
<Assign>
Acc, <Div>
    <Fieldsum>C, acc</FieldSum>,
    <sizeof>C</sizeof>
    </Div>
<\Assign>
<Assign>
Conf, <Div>
    <Fieldsum>C, conf</FieldSum>,
    <sizeof>C</sizeof>
    </Div>
<\Assign>
<Return>
<New>
    Point,
    <value>Lat,Lng,Alt,Acc,Conf</value>
</Return>
</Sequence>
```

The XML code above shows the illustrative centroid algorithm encoded in a series of tags as specified by XML standards. Location program 131 may be enabled to parse the XML tags above, reformat the text to comply with the programming language being used, and carry out the algorithm.

In another embodiment, the collection and localization logic is implemented in a dynamic loadable library ("DLL") on the server 104 instead of in a wire formatted stream. Different DLLs may be categorized by geography or by the version of data computed by the server. When an end device queries the server for certain raw location data, the corresponding DLL is also delivered to the end device by the server. The pre-installed location software on the end device 104 then loads the DLL into its memory space and executes the newly loaded functions to perform the location logic.

Although the invention herein has been described with reference to particular embodiments, it is to be understood that these embodiments are merely illustrative of the principles and applications of the invention. It is therefore to be understood that numerous modifications may be made to the illustrative embodiments and that other arrangements may be devised without departing from the spirit and scope of the invention as defined by the appended claims. Furthermore, while particular processes are shown in a specific order in the appended drawings, such processes are not limited to any particular order unless such order is expressly set forth herein.

The invention claimed is:

1. A method for dynamically specifying location collection and computation logic, the method comprising:
    receiving a request for location data from an end device;
    loading the location data from at least one electronic database;
    determining whether an algorithm version number is indicated in the request and whether the algorithm version number indicated in the request equals a latest algorithm version number;
    embedding the location data and an algorithm for location collection and computation in a stream, if it is determined that the algorithm version number is not indicated in the request or that the algorithm version number indicated in the request is not equal to the latest algorithm version number;
    embedding only the location data in the stream, if it is determined that the algorithm version number is indicated in the request and that the algorithm version number indicated in the request is equal to the latest algorithm version number; and
    streaming the stream to the end device.

2. The method of claim 1, wherein the location data contains information regarding at least one of cellular towers and wireless access points.

3. The method of claim 1, wherein the stream is in a wire format.

4. The method of claim 1, wherein the algorithm is specified using function blocks predefined in a location program of the end device.

5. The method of claim 4, wherein the algorithm reflects relevant changes on the server.

6. The method of claim 5, wherein the location program accommodates relevant changes on the server in order to effectively process location data and compute location.

7. The method of claim 1, wherein the algorithm is consistent with the location data structure.

8. The method of claim 1, wherein the end device is a mobile computing device and the algorithm version number represents the current version of the location collection and computation algorithm stored in the mobile computing device.

9. A processing system for dynamically specifying location collection and computation logic, the processing system comprising:
    at least one processor; and
    a streamer module associated with the at least one processor wherein the streamer module being configured to receive a request for location data from an end device, the request containing an algorithm version number, to load the location data from at least one electronic database, to determine whether an algorithm version number is indicated in the request and whether the algorithm version number indicated in the request equals a latest algorithm version number, to embed the location data and an algorithm for location collection and computation in a stream, if it is determined that the algorithm version number is not indicated in the request or that the algorithm version number indicated in the request is not equal to the latest algorithm version number, to embed only the location data in the stream, if it is determined that the algorithm version number is indicated in the request and that the algorithm version number indicated in the request is equal to the latest algorithm version number, and to stream the stream to an end device.

10. The processing system of claim 9, wherein the streamer module is configured to create the stream in a wired format.

11. The processing system of claim 9, wherein the streamer module is configured to construct the algorithm using function blocks predefined in a location program of the end device.

12. The processing system of claim 11, wherein the streamer module is configured to communicate with the location program of the end device.

13. The processing system of claim 9, wherein the streamer module is configured to analyze and characterize the location data.

14. The processing system of claim 9, wherein the streamer module is configured to check for relevant changes on the system.

15. A method for executing a location collection and calculation algorithm, comprising:
   a processor of an end device transmitting a request for data, the request containing an algorithm version number;
   receiving a stream from a server at an end device;
   a processor of the end device parsing the stream;
   determining if the stream is encoded with an algorithm;
   mapping the algorithm to predefined function blocks, if it is determined that the stream is encoded with an algorithm;
   the processor executing the algorithm provided in the stream, if it is determined that the stream is encoded with an algorithm; and
   the processor executing a previously stored algorithm, if it is determined that the stream is not encoded with an algorithm.

16. The method of claim 15, wherein the stream is in a wire format.

17. The method of claim 15, wherein the predefined function blocks define functions and types applicable to location collection and computation algorithms.

18. The method of claim 15, wherein the predefined function blocks define data structures applicable to location collection and computation algorithms.

19. The method of claim 15, wherein the algorithm version number represents the current version of the location collection and computation algorithm stored in the end device.

20. A location collection and calculation system, comprising:
   a processor; and
   a location program module managed by the processor for executing operations wherein the location program module being configured to transmit a request for data, the request containing an algorithm version number, to receive a stream from a server at an end device, to parse the stream, to determine if the stream is encoded with an algorithm, to map the algorithm to predefined function blocks, if it is determined that the stream is encoded with an algorithm, to execute the algorithm provided in the stream, if it is determined that the stream is encoded with an algorithm, and to execute a currently stored algorithm, if it is determined that the stream is not encoded with an algorithm.

21. The location collection and calculation system of claim 20, wherein the location program module is configured to parse wire formatted streams.

22. The location collection and calculation system of claim 20, wherein the stream is constructed by a streamer module of the server.

* * * * *